(12) United States Patent
Huang

(10) Patent No.: US 12,509,134 B1
(45) Date of Patent: Dec. 30, 2025

(54) FOLDABLE CART FRAME

(71) Applicant: Zhihua Huang, Guangdong (CN)

(72) Inventor: Zhihua Huang, Guangdong (CN)

( * ) Notice: Subject to any disclaimer, the term of this patent is extended or adjusted under 35 U.S.C. 154(b) by 0 days.

(21) Appl. No.: 19/222,109

(22) Filed: May 29, 2025

(51) Int. Cl.
| | |
|---|---|
| *B62B 3/02* | (2006.01) |
| *B62B 3/00* | (2006.01) |
| *B62B 5/04* | (2006.01) |
| *B62B 5/06* | (2006.01) |

(52) U.S. Cl.
CPC ............. *B62B 3/007* (2013.01); *B62B 3/025* (2013.01); *B62B 5/0433* (2013.01); *B62B 5/0461* (2013.01); *B62B 5/067* (2013.01); *B62B 2205/06* (2013.01)

(58) Field of Classification Search
CPC ..... B62B 3/025; B62B 3/007; B62B 2205/06; B62B 7/008; B62B 7/06; B62B 7/10
See application file for complete search history.

(56) References Cited

U.S. PATENT DOCUMENTS

| | | | | |
|---|---|---|---|---|
| 5,915,723 | A * | 6/1999 | Austin | B62B 3/02 |
| | | | | 280/47.35 |
| 9,896,118 | B2 * | 2/2018 | Choi | B62B 3/007 |
| 10,464,588 | B1 * | 11/2019 | Lin | B62B 7/08 |
| 10,604,170 | B1 * | 3/2020 | Davis | B62B 3/008 |
| 10,633,010 | B1 * | 4/2020 | Zhang | B62B 3/025 |
| 11,091,183 | B2 * | 8/2021 | Wu | B62B 3/007 |
| 11,465,664 | B1 * | 10/2022 | Choi | B62B 3/025 |
| 11,772,698 | B2 * | 10/2023 | Cui | B62B 7/08 |
| | | | | 280/650 |
| 11,958,520 | B1 * | 4/2024 | Sun | B62B 5/067 |
| 11,981,364 | B2 * | 5/2024 | Ma | B62B 5/0461 |
| 12,179,820 | B1 * | 12/2024 | Jiang | B62B 3/025 |
| 12,221,150 | B1 * | 2/2025 | Kuang | B62B 7/08 |
| 12,296,882 | B1 * | 5/2025 | Wu | B62B 3/025 |
| 12,304,547 | B2 * | 5/2025 | Kuang | B62B 7/062 |
| 2019/0185038 | A1 * | 6/2019 | Choi | B60B 33/02 |
| 2021/0061332 | A1 * | 3/2021 | Sturgeon | B62B 5/064 |
| 2021/0291886 | A1 * | 9/2021 | Zehfuss | B62B 3/007 |
| 2021/0300450 | A1 * | 9/2021 | Yang | B62B 3/025 |
| 2023/0049293 | A1 * | 2/2023 | Wu | B62B 3/007 |
| 2023/0219608 | A1 * | 7/2023 | Jiang | B62B 3/025 |
| | | | | 280/651 |
| 2023/0242168 | A1 * | 8/2023 | Clemmer | B62B 3/007 |
| | | | | 280/651 |
| 2024/0227907 | A1 * | 7/2024 | Ma | B62B 5/082 |
| 2025/0002064 | A1 * | 1/2025 | Jiang | B62B 3/02 |
| 2025/0145200 | A1 * | 5/2025 | Jianhua | B62B 3/025 |

\* cited by examiner

*Primary Examiner* — Katy M Ebner

(57) ABSTRACT

The present invention discloses a foldable cart frame, comprising a front frame mechanism, a rear frame mechanism, a collapsing mechanism, a foldable upper connection frame, and a foldable lower support frame; when the front frame mechanism and the rear frame mechanism are pushed to collapse or expand, the foldable upper connection frame and the foldable lower support frame rotate to fold or unfold accordingly, an upper end of the collapsing mechanism slides along the foldable upper connection frame, a lower end of the collapsing mechanism slides along the front frame mechanism and the rear frame mechanism to collapse or expand, thereby completing the collapsing and expanding of the entire cart frame.

10 Claims, 10 Drawing Sheets

FOLDABLE CART FRAME

FIELD OF THE APPLICATION

The present invention pertains to the technical field of cart frames, and specifically relates to a foldable cart frame.

BACKGROUND

In daily life and industrial production, carts are widely utilized as convenient transport tools. With increasing demands for diverse usage scenarios and portability of carts, the need for foldable cart frames has grown significantly.

Existing foldable cart frames exhibit structural deficiencies in design. Some cart frames feature complex collapsing mechanisms with cumbersome operations, requiring substantial time and effort for expansion and collapse, thereby failing to meet users' needs for rapid deployment and storage. For example, during the collapsing and expanding processes of certain cart frames, poor interlocking coordination between components may cause jamming or misalignment, compromising user experience. Additionally, traditional cart frames lack rational load-bearing structural designs, resulting in poor stability under heavy loads. These frames cannot effectively distribute weight pressure, leading to potential deformation or damage and shortening the service life of the cart.

To address these issues, a foldable cart frame is designed accordingly.

SUMMARY

The technical problem to be solved by the present invention is to overcome the deficiencies of the prior art and provide a foldable cart frame.

To address the above technical problem, the technical solution provided by the present invention is a foldable cart frame, comprising:
  a front frame mechanism, a rear frame mechanism, a collapsing mechanism, a foldable upper connection frame, and a foldable lower support frame;
  wherein the front frame mechanism is symmetrically provided with first upper connecting members at an upper end, rear ends of the first upper connecting members are rotatably provided with the foldable upper connection frame;
  the front frame mechanism is symmetrically provided with first lower connecting members at a lower end, front ends of the foldable lower support frame are rotatably connected to the two first lower connecting members, respectively;
  the rear frame mechanism is symmetrically provided with second upper connecting members at an upper end, front ends of the second upper connecting members are rotatably connected to corresponding foldable upper connection frames;
  the rear frame mechanism is symmetrically provided with second lower connecting members at a lower end, rear ends of the foldable lower support frame are rotatably connected to the two second lower connecting members, respectively;
  the collapsing mechanisms are provided on the two foldable upper connection frames, respectively, and the collapsing mechanisms are slidably connected to the foldable upper connection frames;
  lower ends of the collapsing mechanisms are slidably connected to the front frame mechanism and the rear frame mechanism, respectively, such that when the front frame mechanism and the rear frame mechanism are pushed to collapse or expand, the foldable upper connection frame and the foldable lower support frame rotate to fold or unfold accordingly, upper ends of the collapsing mechanisms slide along the foldable upper connection frames, and the lower ends of the collapsing mechanisms slide along the front frame mechanism and the rear frame mechanism to collapse or expand, thereby completing the collapsing and expanding of the entire cart frame.

The lower ends of the first lower connecting members are provided with caster wheel assemblies, and the rear frame mechanism is provided with a rear wheel assembly below.

As an improvement, the collapsing mechanism comprises a rotational shaft, a left folding arm, a right folding arm, and a locking mechanism; the left folding arm and the right folding arm are cross-arranged at middle upper portions, and a rotational shaft is rotatably provided at the cross position, the left folding arm and the right folding arm being rotatably connected via the rotational shaft; upper and lower ends of the left folding arm and the right folding arm are each provided with the locking mechanism; an upper end of the left folding arm and an upper end of the right folding arm are slidably connected to the foldable upper connection frame via the locking mechanism; a lower end of the left folding arm is slidably connected to the rear frame mechanism via the locking mechanism, and a lower end of the right folding arm is slidably connected to the front frame mechanism via the locking mechanism;

the locking mechanism at the upper ends of the left folding arm and the right folding arm is provided with a first through hole; the foldable upper connection frame is symmetrically provided with second through holes; when the frame is expanded, the first through hole and the second through hole coincide and are fixedly connected by a bolt inserted through the first through hole and the second through hole.

As an improvement, both ends of the rotational shaft are respectively provided with housing covers; side walls of the housing covers are provided with slots penetrating through the housing covers; the left folding arm and the right folding arm are respectively positioned at the slots of the corresponding housing covers.

As an improvement, the front frame mechanism comprises a front support leg, a front upper crossbeam, and a front lower crossbeam; both ends of the front upper crossbeam are respectively inserted into the first upper connecting members and fixed by bolts; an upper end of the front support leg is inserted into a lower end of the first upper connecting member and fixed by a bolt; a lower end of the front support leg is inserted into an upper end of the first lower connecting member and fixed by a bolt; both ends of the front lower crossbeam are respectively inserted into the first lower connecting members and fixed by bolts; the lower end of the right folding arm is slidably connected to the front support leg via the locking mechanism.

As an improvement, a middle-lower portion of the front support leg is provided with a limit sleeve and fixed by a bolt; the limit sleeve performs limiting on the locking mechanism at the lower end of the right folding arm.

As an improvement, the rear frame mechanism comprises a rear support leg, a rear upper crossbeam, a rear lower crossbeam, a positioning sleeve, and a directional foldable handle; both ends of the rear upper crossbeam are respectively inserted into the second upper connecting members and fixed by bolts; an upper end of the rear support leg is inserted into a lower end of the second upper connecting member and fixed by a bolt; the second lower connecting member is sleeved on a lower portion of the rear support leg and fixed by a bolt; both ends of the rear lower crossbeam are respectively inserted into the second lower connecting members and fixed by bolts; a lower end of the left folding arm is slidably connected to the rear support leg via the locking mechanism; two ends of the directional foldable handle are respectively inserted into the two second upper connecting members from above and extend downward out of the second upper connecting members; the directional foldable handle and the second upper connecting members are connected by bolts; the positioning sleeve is sleeved on a middle portion of the rear support leg and connected by a bolt; an end of the directional foldable handle extending out of the second upper connecting member is inserted into the positioning sleeve and connected by a bolt;

wherein the rear wheel assembly is disposed below the two rear support legs;

wherein the lower end of the left folding arm is slidably connected to the rear support leg via the locking mechanism;

wherein the positioning sleeve performs limiting on the locking mechanism at the lower end of the left folding arm.

As an improvement, further comprising a locking mechanism;

the locking mechanism comprises a support base and a linkage rod;

one end of the support base is rotatably connected to the rear support leg via a bolt; both ends of the linkage rod are respectively inserted into corresponding support bases and fixed by bolts;

an outer side of the support base is provided with a limit rod;

inner sides of two wheels of the rear wheel assembly are each provided with a gear;

the limit rod engages with the gear to perform limiting on the rear wheel assembly;

a middle portion of the linkage rod is provided with a pedal.

As an improvement, the foldable upper connection frame comprises a U-shaped connecting member and upper connecting rods;

both ends of the U-shaped connecting member are rotatably provided with the upper connecting rods via bolts;

one end of one of the upper connecting rods is rotatably connected to the first upper connecting member via a bolt, and one end of the other upper connecting rod is rotatably connected to the second upper connecting member via a bolt;

the locking mechanisms located on the left folding arm and the right folding arm are slidably connected to the corresponding upper connecting rods, respectively;

the second through holes are provided on the upper connecting rods.

As an improvement, the foldable lower support frame comprises a front lower bracket, a rear lower bracket, a central connecting member, and a lower link mechanism;

front ends of the front lower bracket are rotatably connected to the two first lower connecting members via bolts, respectively;

rear ends of the rear lower bracket are rotatably connected to the two second lower connecting members via bolts, respectively;

front ends of the rear lower bracket are symmetrically provided with the central connecting member and connected by bolts;

front ends of the central connecting member are rotatably connected to both ends of the front lower bracket via bolts, respectively;

an inner side of the central connecting member is provided with insertion sleeves;

both ends of the lower link mechanism are respectively inserted into the two insertion sleeves and connected by bolts.

As an improvement, each of the central connecting members is provided with two insertion sleeves.

The advantages of the present invention compared to the prior art are as follows:

1. The front frame mechanism, rear frame mechanism, collapsing mechanism, foldable upper connection frame, and foldable lower support frame cooperate with each other. When the front frame mechanism and rear frame mechanism are pushed to collapse or expand, the foldable upper connection frame and foldable lower support frame rotate to fold or unfold accordingly. The upper end of the collapsing mechanism slides along the foldable upper connection frame, and the lower end of the collapsing mechanism slides along the front frame mechanism and rear frame mechanism to collapse or expand, thereby completing the collapsing and expanding of the entire cart frame. This design enables convenient expansion and collapse.

2. The left folding arm and right folding arm are cross-arranged at middle upper portions and rotatably connected via a rotational shaft. The upper and lower ends of the left and right folding arms are each provided with a locking mechanism. The upper ends of the left and right folding arms are slidably connected to the foldable upper connection frame via the locking mechanisms; the lower end of the left folding arm is slidably connected to the rear frame mechanism via the locking mechanism, and the lower end of the right folding arm is slidably connected to the front frame mechanism via the locking mechanism.

Cross-arranged structural design of the left and right folding arms ensures improved force distribution and balance, effectively decomposing load pressure and enhancing load-bearing capacity, thereby achieving superior stability and support for the entire frame.

Four sliding points at the upper and lower ends of the left and right folding arms enable smoother collapsing and expanding operations.

After the frame is expanded, the first through hole on the locking mechanism and second through hole on the foldable upper connection frame coincide, and a bolt is inserted through both holes to fix the connection. This provides quick and secure fixation, ensuring the frame remains stably locked in the expanded state.

3. The cart frame features a sleek and streamlined overall appearance and is highly portable.

BRIEF DESCRIPTION OF THE DRAWINGS

As shown in FIGS. 1-10:
1. First upper connecting member
2. First lower connecting member
3. Second upper connecting member
4. Second lower connecting member
5. Caster wheel assembly
6. Rear wheel assembly
6-1. Gear
10. Rotational shaft
11. Left folding arm
12. Right folding arm
13. Locking mechanism
14. Housing cover
15. Slot
16. First through-hole
17. Second through-hole
21. Front support leg
22. Front upper crossbeam
23. Front lower crossbeam
24. Limit sleeve
31. Rear support leg
32. Rear upper crossbeam
33. Rear lower crossbeam
34. Positioning sleeve
35. Directional foldable handle
41. Support base
42. Linkage rod
43. Limit rod
44. Pedal
51. U-shaped connecting member
52. Upper connecting rod
61. Front lower bracket
62. Rear lower bracket
63. Central connecting member
64. Lower link mechanism
65. Insertion sleeve While the technology is susceptible to various modifications and alternative forms, specifics thereof have been shown by way of example and drawings, and will be described in detail. It should be understood, however, that the application is not limited to the particular embodiments described. On the contrary, the application is to cover modifications, equivalents, and alternatives falling within the spirit and scope of the technology.

DETAILED DESCRIPTION OF EMBODIMENTS

The embodiments of the present technology described herein are not intended to be exhaustive or to limit the technology to the precise forms disclosed in the following detailed description. Rather, the embodiments are chosen and described so that others skilled in the art can appreciate and understand the principles and practices of the present technology.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

The present invention is further described in detail below with reference to the accompanying drawings.

Figure 1:
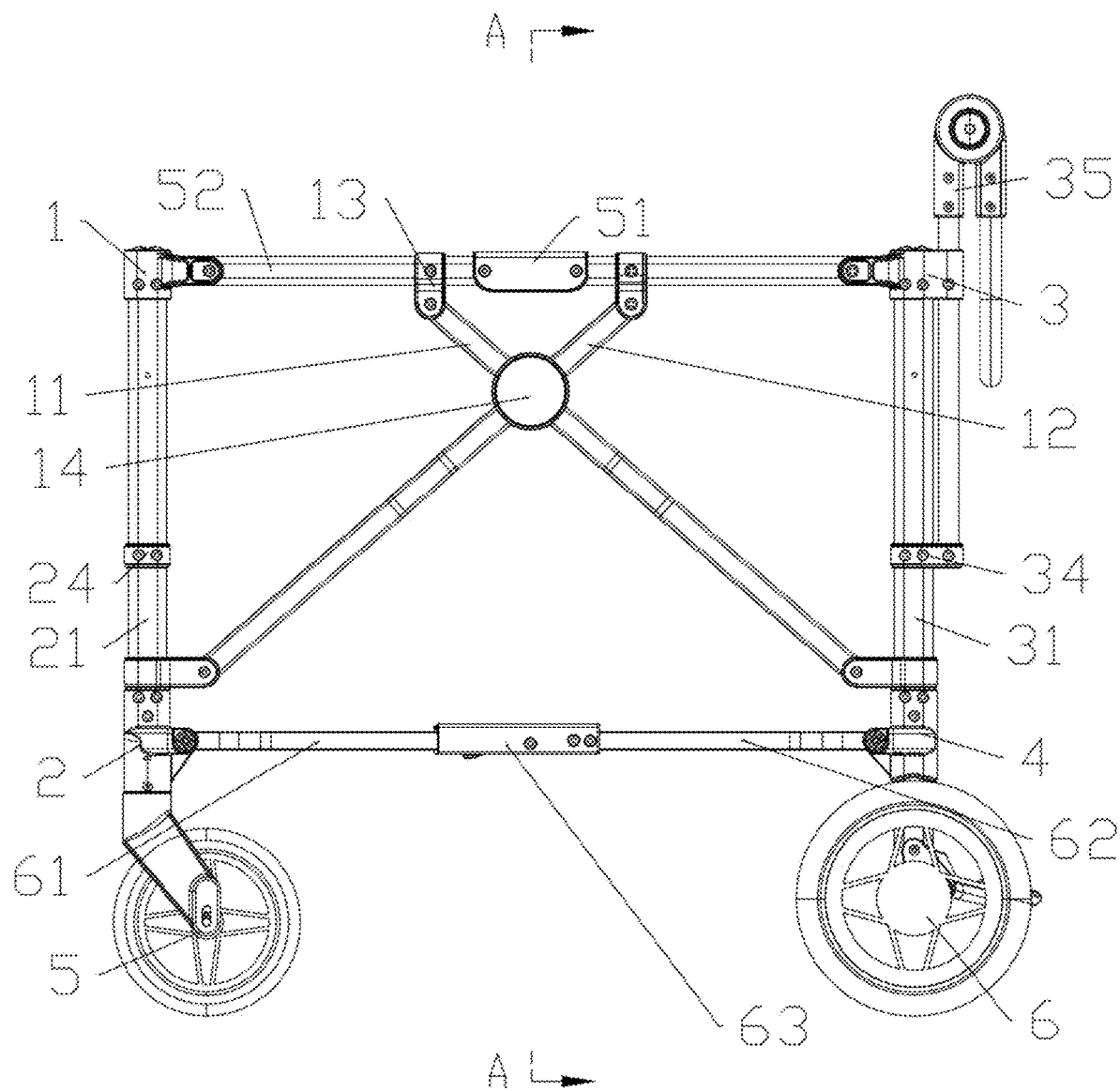
FIG. 1 is a side view of the foldable cart frame according to the present invention.
Figure 2:
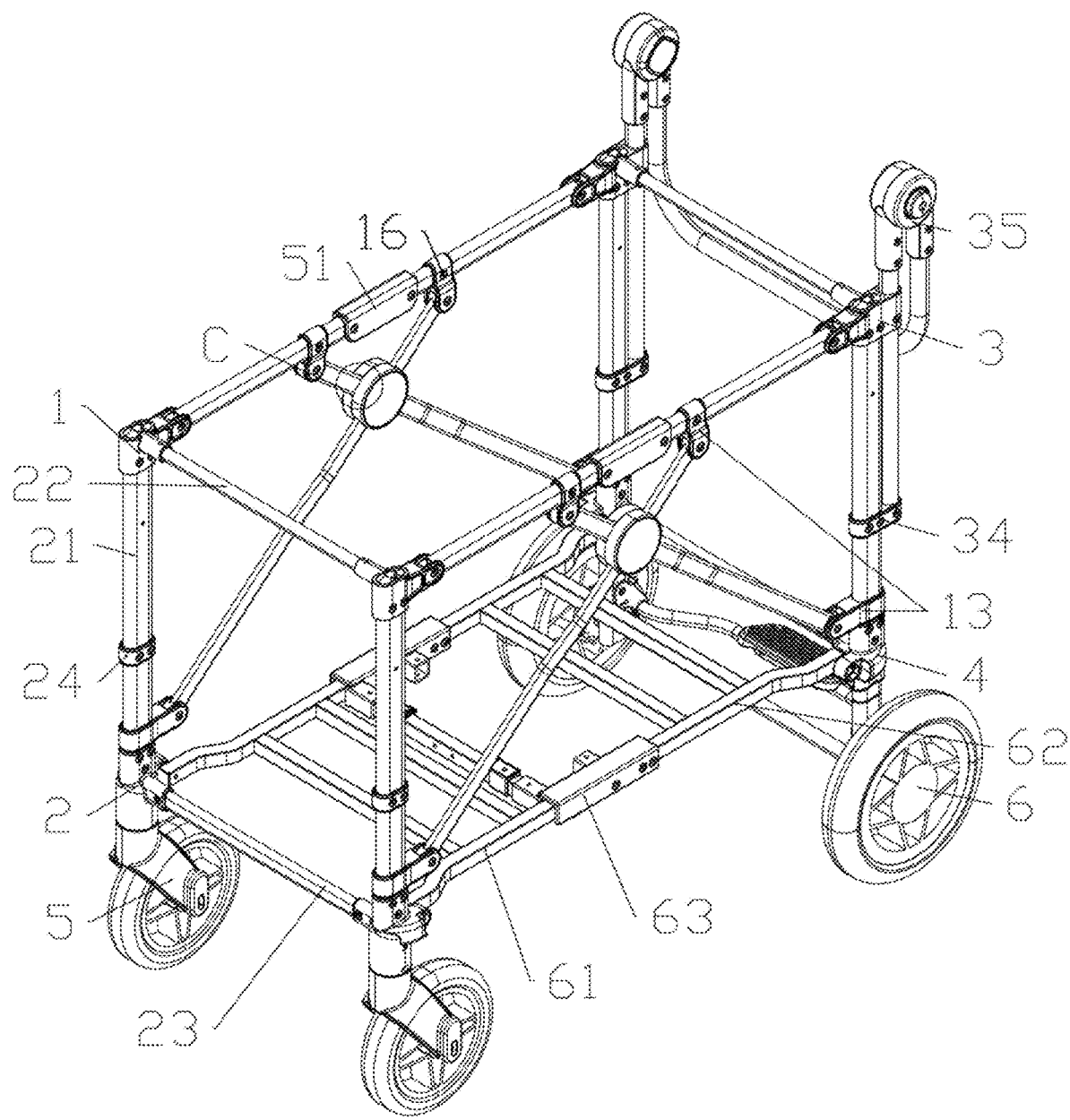
FIG. 2 is a front perspective structural schematic view of the foldable cart frame according to the present invention.
Figure 3:
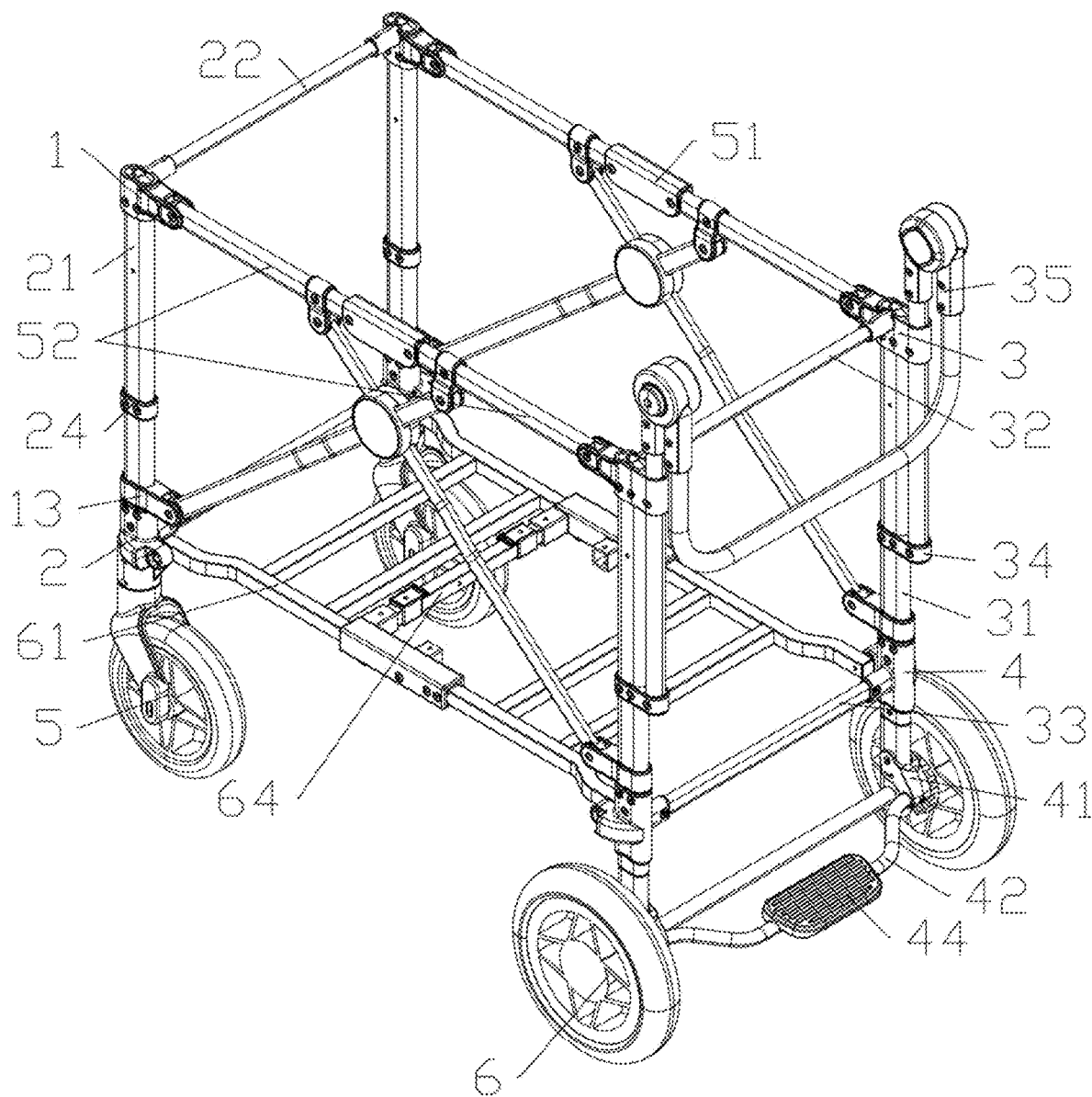
FIG. 3 is a rear perspective structural schematic view of the foldable cart frame according to the present invention.
Figure 4:
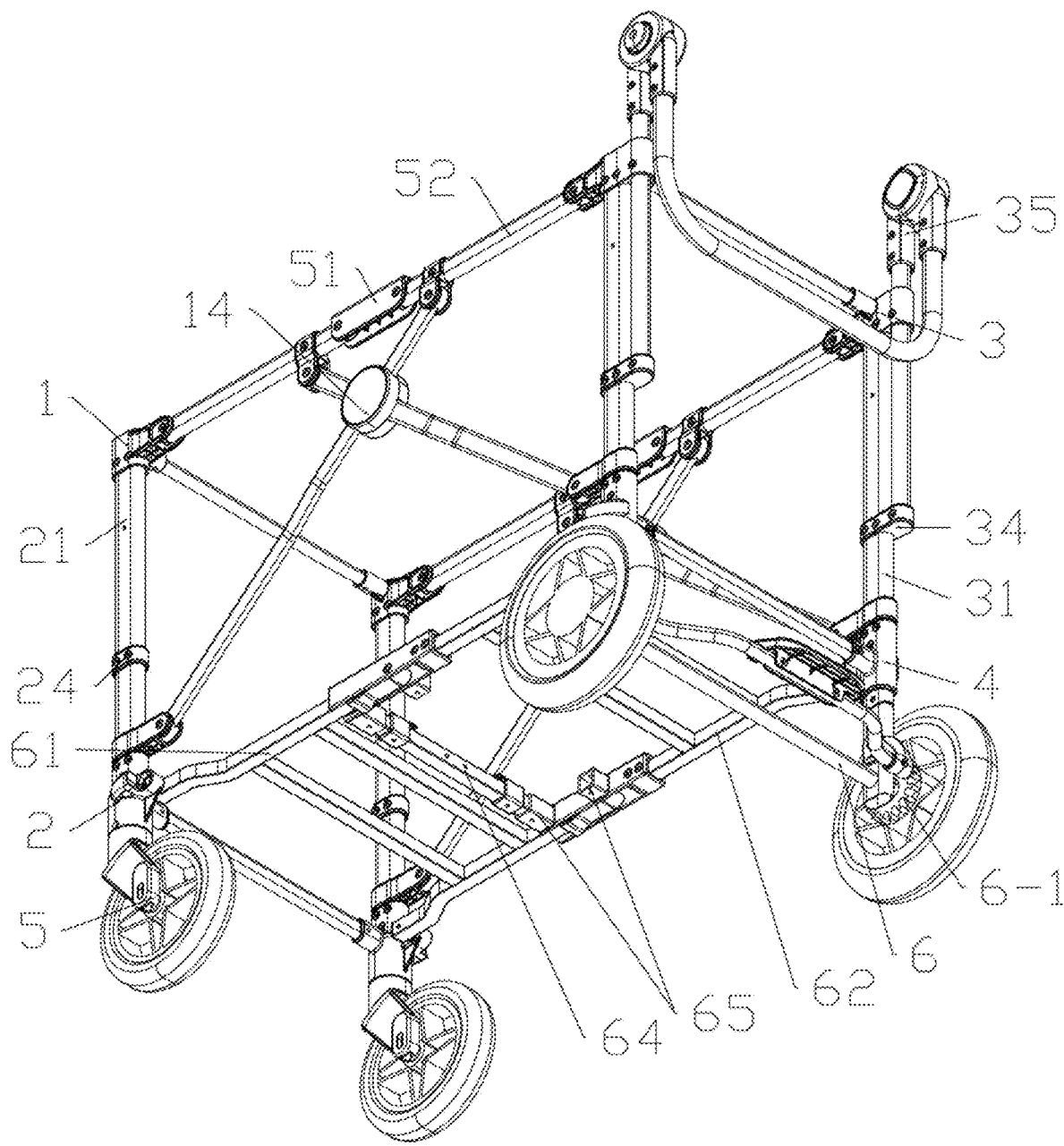
FIG. 4 is a bottom perspective structural schematic view of the foldable cart frame according to the present invention.
Figure 5:
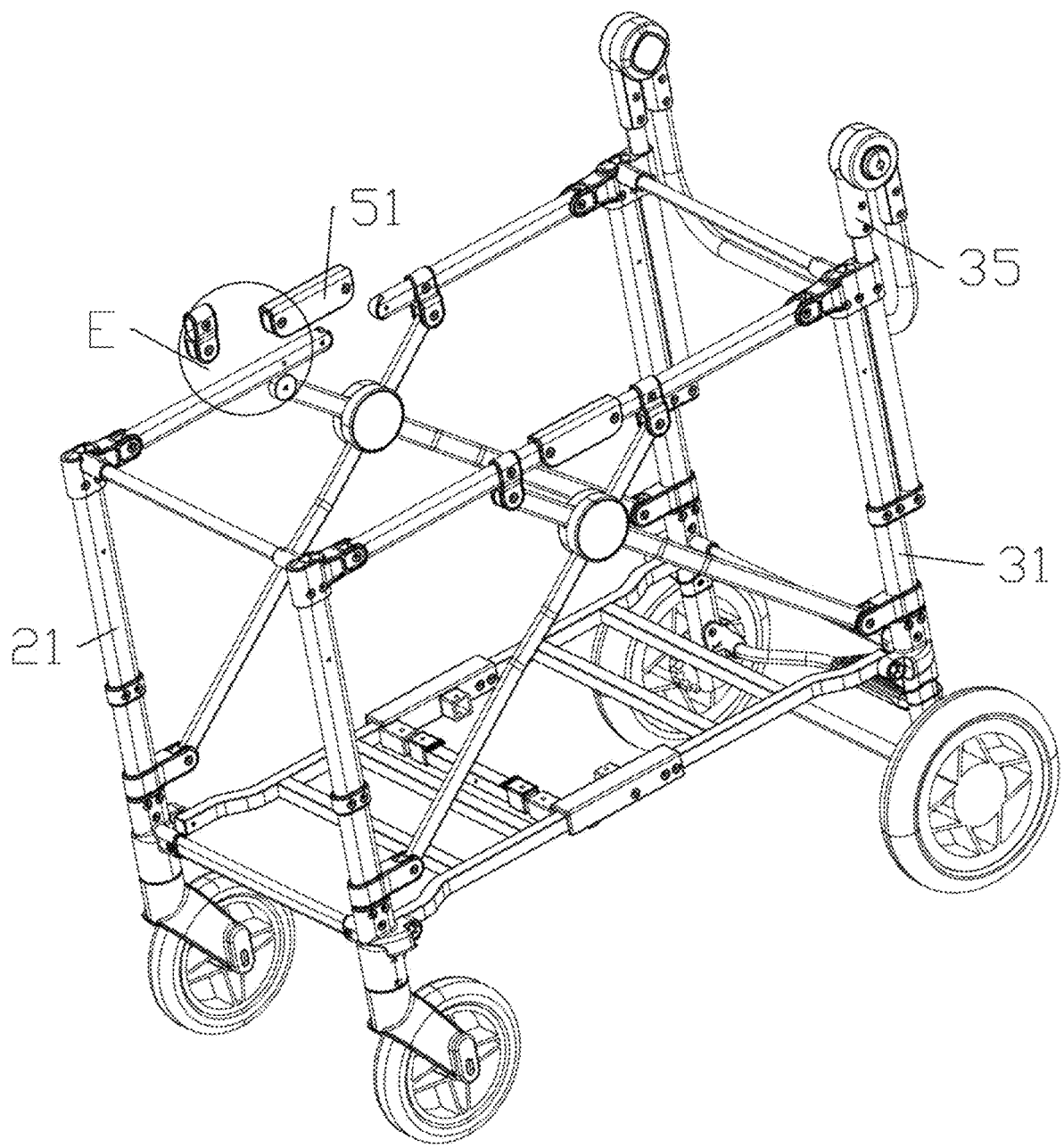
FIG. 5 is a schematic view of the foldable cart frame in a disassembled state according to the present invention.
Figure 6:
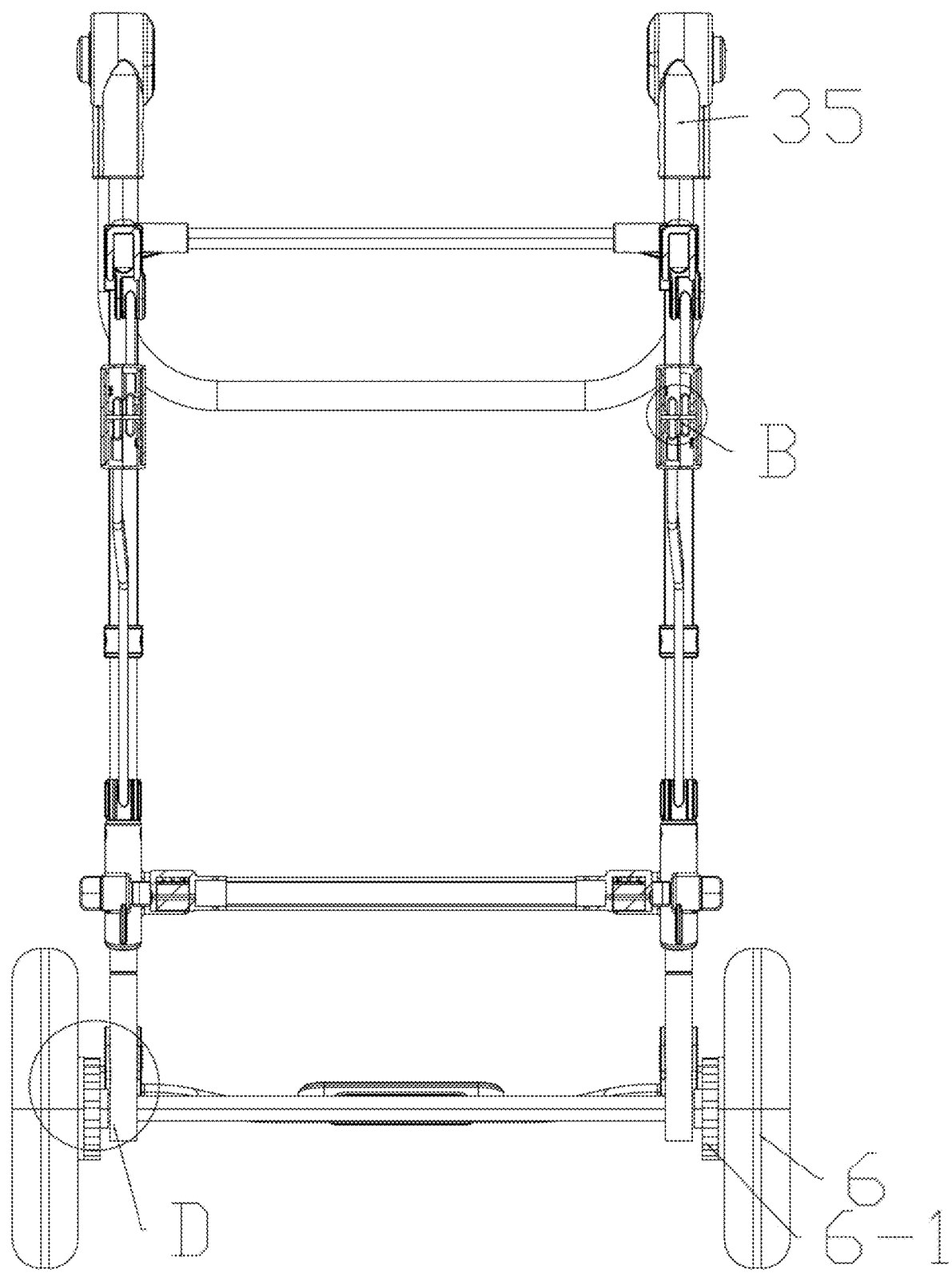
FIG. 6 is a cross-sectional view taken along line A-A in FIG. 1.
Figure 7:
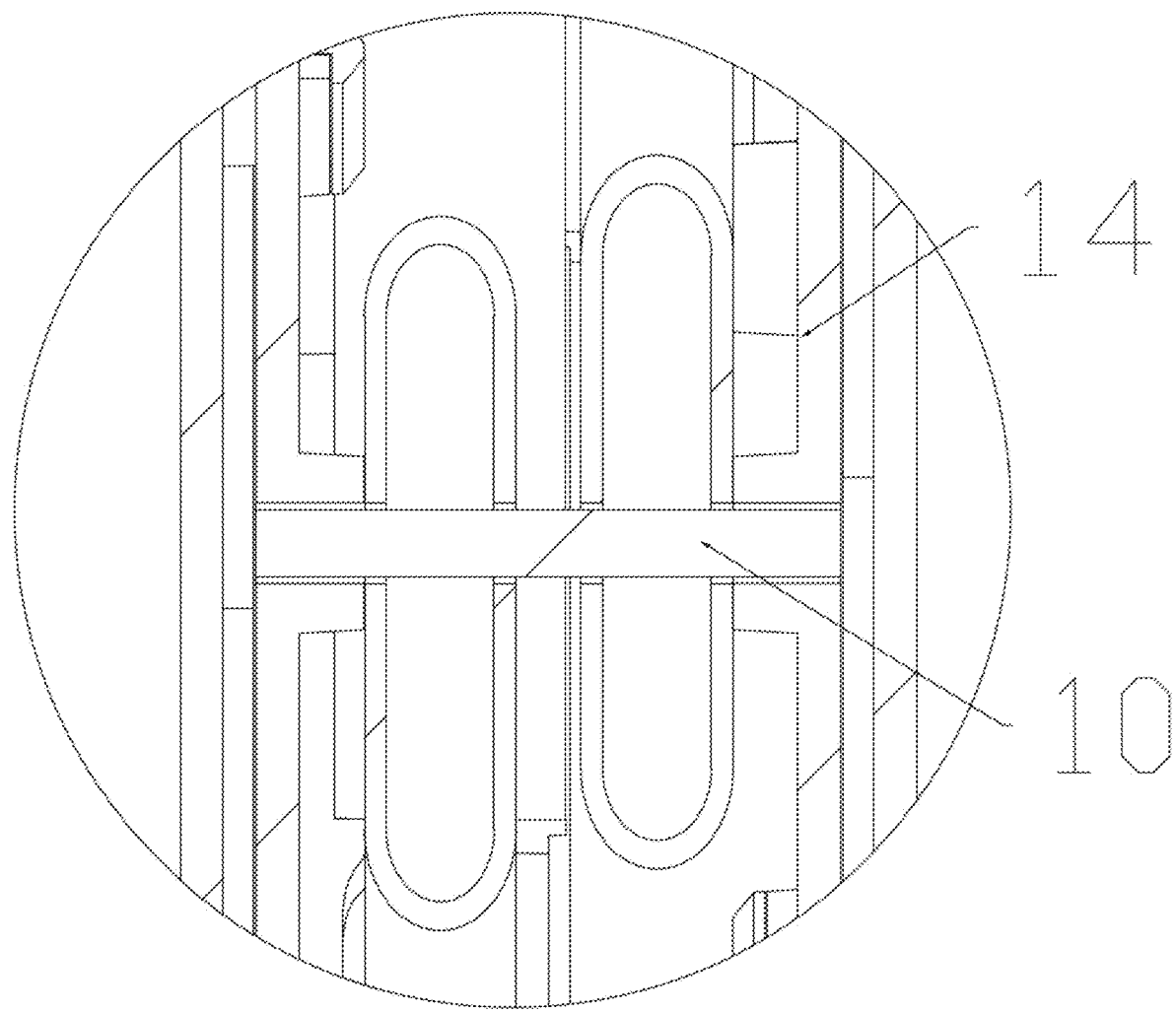
FIG. 7 is a partial enlarged view of portion B in FIG. 6.
Figure 8:
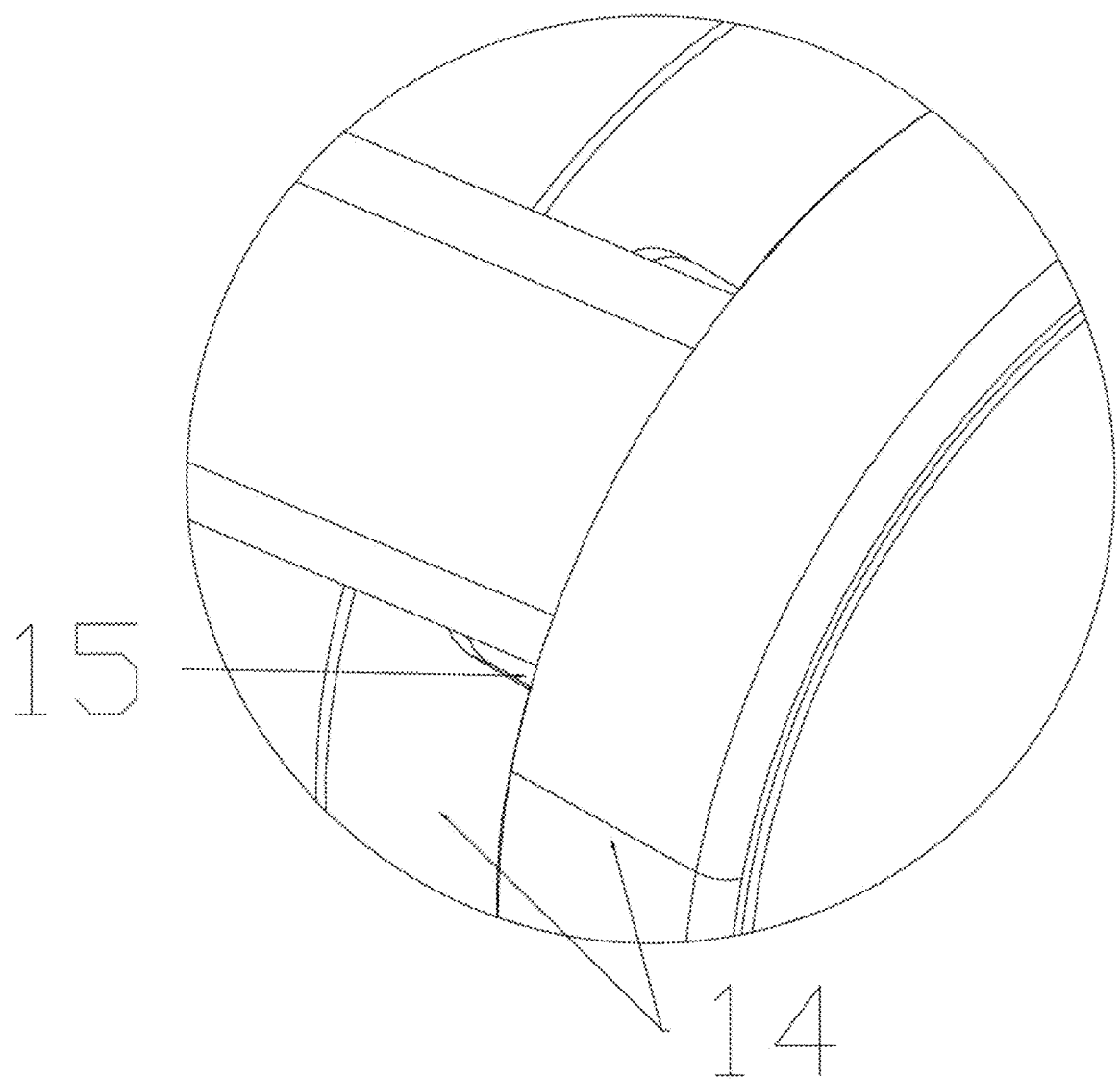
FIG. 8 is a partial enlarged view of portion C in FIG. 2.
Figure 9:
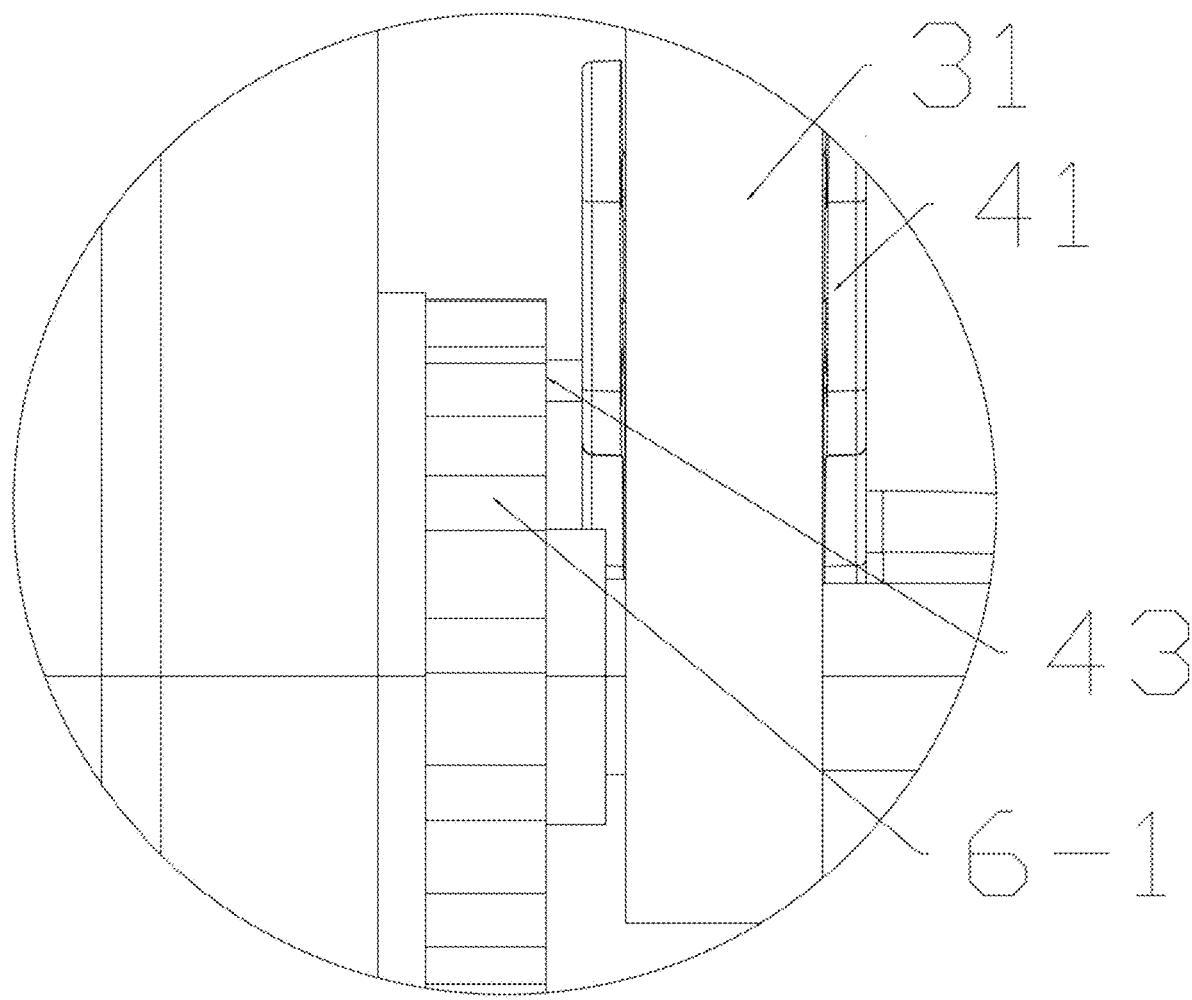
FIG. 9 is a partial enlarged view of portion D in FIG. 6.
Figure 10:
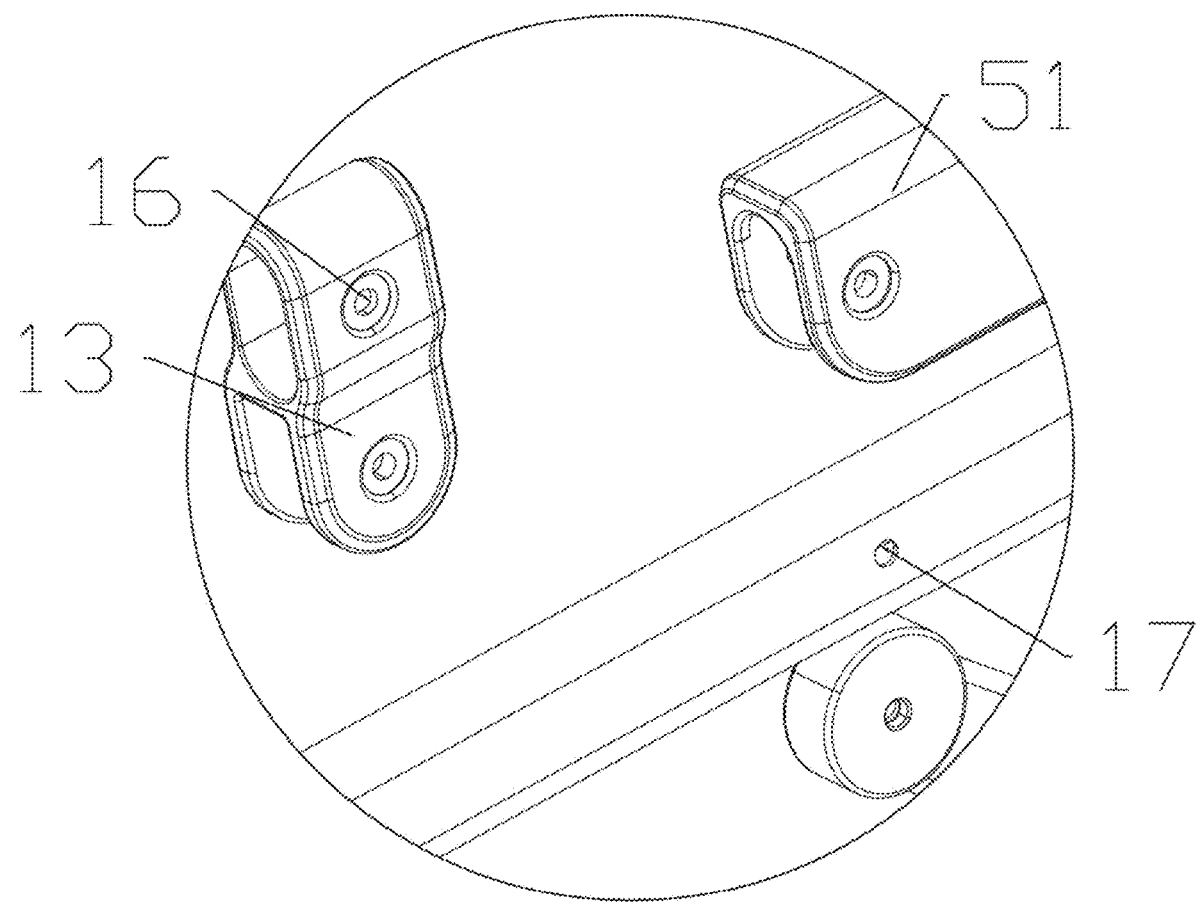
FIG. 10 is a partial enlarged view of portion E in FIG. 5.

With reference to FIGS. 1-10, a foldable cart frame comprises: a front frame mechanism, a rear frame mechanism, a collapsing mechanism, a foldable upper connection frame, and a foldable lower support frame; wherein an upper end of the front frame mechanism is symmetrically provided with a first upper connecting member 1; a rear end of the first upper connecting member 1 is rotatably provided with the foldable upper connection frame; a lower end of the front frame mechanism is symmetrically provided with a first lower connecting member 2; front ends of the foldable lower support frame are rotatably connected to the two first lower connecting members 2, respectively; wherein an upper end of the rear frame mechanism is symmetrically provided with a second upper connecting member 3; a front end of the second upper connecting member 3 is rotatably connected to a corresponding foldable upper connection frame; a lower end of the front frame mechanism is symmetrically provided with a second lower connecting member 4; rear ends of the foldable lower support frame are rotatably connected to the two second lower connecting members 4, respectively; wherein the collapsing mechanisms are provided on the two foldable upper connection frames, respectively, and the collapsing mechanisms are slidably connected to the foldable upper connection frames; lower ends of the collapsing mechanisms are slidably connected to the front frame mechanism and the rear frame mechanism, respectively; such that when the front frame mechanism and the rear frame mechanism are pushed to collapse or expand: the foldable upper connection frame and the foldable lower support frame rotate to fold or unfold accordingly; upper ends of the collapsing mechanisms slide along the foldable upper connection frames; lower ends of the collapsing mechanisms slide along the front frame mechanism and the rear frame mechanism to collapse or expand; thereby completing collapsing and expanding of the entire cart frame.

The first lower connecting member 2 is provided with a caster wheel assembly 5 at a lower end, and the rear frame mechanism is provided with a rear wheel assembly 6 below, thereby enabling the frame to be mobile; the design of the caster wheel assembly 5 enhances directional maneuverability of the frame.

The collapsing mechanism comprises:
a rotational shaft 10, a left folding arm 11, a right folding arm 12, and a locking mechanism 13;
wherein middle upper portions of the left folding arm 11 and the right folding arm 12 are cross-arranged, and the rotational shaft 10 is rotatably provided at the cross position;
wherein the left folding arm 11 and the right folding arm 12 are rotatably connected via the rotational shaft 10;
wherein upper and lower ends of the left folding arm 11 and the right folding arm 12 are each provided with the locking mechanism 13;
wherein upper ends of the left folding arm 11 and the right folding arm 12 are slidably connected to the foldable upper connection frame via the locking mechanism 13;
wherein a lower end of the left folding arm 11 is slidably connected to the rear frame mechanism via the locking mechanism 13, and a lower end of the right folding arm 12 is slidably connected to the front frame mechanism via the locking mechanism 13.

The locking mechanism 13 at the upper ends of the left folding arm 11 and the right folding arm 12 is provided with a first through hole 16;

the foldable upper connection frame is symmetrically provided with second through holes 17;

wherein when the frame is expanded, the first through hole 16 and the second through hole 17 coincide and are fixedly connected by a bolt inserted through the first through hole 16 and the second through hole 17, thereby stably maintaining the frame in the expanded state.

Both ends of the rotational shaft 10 are respectively provided with housing covers 14;

side walls of the housing covers 14 are provided with slots 15 penetrating through the housing covers 14;

the left folding arm 11 and the right folding arm 12 are positioned at the slots 15 of the corresponding housing covers 14, respectively, providing a protective function.

The front frame mechanism comprises:

a front support leg 21, a front upper crossbeam 22, and a front lower crossbeam 23;

wherein both ends of the front upper crossbeam 22 are inserted into the first upper connecting member 1 and fixed by bolts;

wherein an upper end of the front support leg 21 is inserted into a lower end of the first upper connecting member 1 and fixed by a bolt;

wherein a lower end of the front support leg 21 is inserted into an upper end of the first lower connecting member 2 and fixed by a bolt;

wherein both ends of the front lower crossbeam 23 are inserted into the first lower connecting member 2 and fixed by bolts;

wherein a lower end of the right folding arm 12 is slidably connected to the front support leg 21 via the locking mechanism 13.

A middle-lower portion of the front support leg 21 is provided with a limit sleeve 24 and fixed by a bolt;

the limit sleeve 24 performs limiting on the locking mechanism 13 at the lower end of the right folding arm 12, preventing excessive sliding and ensuring structural stability of the frame.

The rear frame mechanism comprises:

a rear support leg 31, a rear upper crossbeam 32, a rear lower crossbeam 33, a positioning sleeve 34, and a directional foldable handle 35;

wherein both ends of the rear upper crossbeam 32 are inserted into the second upper connecting member 3 and fixed by bolts;

wherein an upper end of the rear support leg 31 is inserted into a lower end of the second upper connecting member 3 and fixed by a bolt;

wherein the second lower connecting member 4 is sleeved on a lower portion of the rear support leg 31 and fixed by a bolt;

wherein both ends of the rear lower crossbeam 33 are inserted into the second lower connecting member 4 and fixed by bolts;

wherein a lower end of the left folding arm 11 is slidably connected to the rear support leg 31 via the locking mechanism 13;

wherein two ends of the directional foldable handle 35 are inserted into the two second upper connecting members 3 from above and extend downward out of the second upper connecting members 3;

wherein the directional foldable handle 35 and the second upper connecting members 3 are connected by bolts;

wherein the positioning sleeve 34 is sleeved on a middle portion of the rear support leg 31 and connected by a bolt;

wherein an end of the directional foldable handle 35 extending out of the second upper connecting member 3 is inserted into the positioning sleeve 34 and connected by a bolt, thereby achieving stable installation of the directional foldable handle.

The rear wheel assembly 6 is disposed below the two rear support legs 31, providing support and mobility functions for the cart;

the lower end of the left folding arm 11 is slidably connected to the rear support leg 31 via the locking mechanism 13;

the positioning sleeve 34 performs limiting on the locking mechanism 13 at the lower end of the left folding arm 11, ensuring accuracy during collapsing and expanding operations.

Further comprising a locking mechanism;

the locking mechanism comprises a support base 41 and a linkage rod 42;

one end of the support base 41 is rotatably connected to the rear support leg 31 via a bolt;

both ends of the linkage rod 42 are respectively inserted into corresponding support bases 41 and fixed by bolts;

an outer side of the support base 41 is provided with a limit rod 43;

inner sides of two wheels of the rear wheel assembly 6 are each provided with a gear 6-1;

the limit rod 43 engages with the gear 6-1 to perform limiting on the rear wheel assembly 6;

a middle portion of the linkage rod 42 is provided with a pedal 44;

stepping downward on the pedal 44 with a foot drives the support base 41 to rotate downward, thereby positioning the limit rod 43 within tooth gaps of the gear 6-1, preventing rotation of the rear wheel assembly 6 and enabling fixation of the cart in specific scenarios to avoid sliding.

The foldable upper connection frame comprises a U-shaped connecting member 51 and upper connecting rods 52;

both ends of the U-shaped connecting member 51 are rotatably provided with the upper connecting rods 52 via bolts;

one end of one upper connecting rod 52 is rotatably connected to the first upper connecting member 1 via a bolt, and one end of the other upper connecting rod 52 is rotatably connected to the second upper connecting member 3 via a bolt;

the locking mechanisms 13 located on the left folding arm 11 and the right folding arm 12 are slidably connected to the corresponding upper connecting rods 52, respectively;

the second through holes 17 are provided on the upper connecting rods 52, cooperating with the first through holes 16 on the corresponding locking mechanisms 13 to fix the frame in the expanded state.

The foldable lower support frame comprises: a front lower bracket 61, a rear lower bracket 62, a central connecting member 63, and a lower link mechanism 64; wherein front ends of the front lower bracket 61 are rotatably connected to the two first lower connecting members 2 via bolts; wherein rear ends of the rear lower bracket 62 are rotatably connected to the two second lower connecting members 4 via bolts; wherein front ends of the rear lower bracket 62 are symmetrically provided with the central connecting member 63 and connected by bolts; wherein front ends of the central connecting member 63 are rotatably connected to both ends of the front lower bracket 61 via bolts; wherein an inner side of the central connecting member 63 is provided with insertion sleeves 65; wherein both ends of the lower link mechanism 64 are respectively inserted into the two insertion sleeves 65 and connected by bolts, ensuring structural stability of the lower support frame.

Each central connecting member 63 is provided with two insertion sleeves 65.

Frame Collapsing and Expanding Process

Expanding Process:

Push the front frame mechanism and rear frame mechanism outward to expand;

During expansion:
  The foldable upper connection frame including the U-shaped connecting member 51 and upper connecting rods 52 and foldable lower support frame including the front lower bracket 61, rear lower bracket 62, and central connecting member 63 rotate downward to gradually reach a horizontal state;
  The locking mechanisms 13 at the upper ends of the left folding arm 11 and right folding arm 12 slide along the upper connecting rods 52 toward the central U-shaped connecting member 51;
  The locking mechanisms 13 at the lower ends of the left folding arm 11 and right folding arm 12 slide downward along the rear support leg 31;

Upon Full Expansion:
  The first through hole 16 and second through hole 17 coincide; Insert a bolt through both holes to fix the locking mechanisms 13;
  The cross-expanded left and right folding arms 11, 12 form a stable support, locking the frame in the expanded state.

Usage:
  Deploy the directional foldable handle 35 for pushing or pulling the cart;
  Adjust the angle of the upper handle portion of the directional foldable handle 35 as needed; it remains fixed at the adjusted position.

Collapsing Process:
  Remove the bolt from the first through hole 16 and second through hole 17;
  Push the front frame mechanism and rear frame mechanism inward to collapse;

During Collapse:
  The U-shaped connecting member 51 and upper connecting rods 52 rotate upward, with the U-shaped connecting member 51 gradually ascending;
  The front lower bracket 61, rear lower bracket 62, and central connecting member 63 rotate upward toward a vertical state;
  The locking mechanisms 13 at the upper ends of the left folding arm 11 and right folding arm 12 slide along the upper connecting rods 52 away from the central U-shaped connecting member 51 i.e., downward;
  The locking mechanisms 13 at the lower ends of the left folding arm 11 and right folding arm 12 slide upward along the rear support leg 31
  The limit sleeve 24 performs limiting on the locking mechanism 13 at the lower end of the right folding arm 12;
  The positioning sleeve 34 performs limiting on the locking mechanism 13 at the lower end of the left folding arm 11;

Final Collapse:
  The front frame mechanism and rear frame mechanism converge completely;
  Fold the upper handle portion of the directional foldable handle 35.

In the description of embodiments of the present invention, it is to be noted that: Terms indicating orientation or positional relationships, such as "center," "upper," "lower," "left," "right," "vertical," "horizontal," "inner," or "outer," are based on the orientation or positional relationships shown in the accompanying drawings or the customary placement of the product during use. These terms are used solely to simplify the description of the invention and are not to be construed as requiring the device or components to have specific orientations or configurations.

Terms such as "first," "second," or "third" are used for differentiation only and do not imply relative importance.

Further, terms like "horizontal," "vertical," or "suspended" do not require absolute alignment but allow for slight deviations. For example, "horizontal" refers to a direction relatively closer to horizontal compared to "vertical," not necessarily perfect alignment.

The term "plurality" means "at least two."

Unless otherwise explicitly defined, terms such as "mounted," "installed," "connected," or "coupled" should be interpreted broadly. For example:

Connections may be fixed, detachable, or integral; Connections may be mechanical, electrical, or via an intermediary;

Connections may refer to direct linkage or internal communication between two components.

These terms are to be understood contextually by those skilled in the art.

Regarding the scope of the invention:

The above description and drawings illustrate only one embodiment of the invention. The actual structure is not limited to this example. Any design or embodiment derived by a person skilled in the art, without departing from the inventive concept of the present invention, shall fall within the protection scope of the invention.

What is claimed is:

1. A foldable cart frame, comprising a front frame mechanism, a rear frame mechanism, two collapsing mechanisms, two foldable upper connection frames, and a foldable lower support frame; wherein the front frame mechanism is symmetrically provided with first upper connecting members at an upper end, a rear end of each of the first upper connecting members is rotatably provided with one of the foldable upper connection frames; the front frame mechanism is symmetrically provided with two first lower connecting members at a lower end, front ends of the foldable lower support frame are rotatably connected to the two first lower connecting members, respectively; the rear frame mechanism is symmetrically provided with second upper connecting members at an upper end, front end of each of the second upper connecting members is rotatably connected to a corresponding foldable upper connection frame; the rear frame mechanism is symmetrically provided with two second lower connecting members at a lower end, rear ends of the foldable lower support frame are rotatably connected to the two second lower connecting members, respectively; one of the collapsing mechanisms is provided on each of the two foldable upper connection frames, and each collapsing mechanisms is slidably connected to a respective foldable upper connection frame; lower ends of the collapsing mechanisms are slidably connected to the front frame mechanism and the rear frame mechanism, respectively, such that when the front frame mechanism and the rear frame mechanism are pushed to collapse or expand, the foldable upper connection frame and the foldable lower support frame rotate to fold or unfold accordingly, upper ends of the collapsing mechanisms slide along the foldable upper connection frames, and the lower ends of the collapsing mechanisms slide along the front frame mechanism and the rear frame mechanism to collapse or expand, thereby completing collapsing and expanding of the entire cart frame;

wherein the first lower connecting members are provided with caster wheel assemblies at lower ends, and the rear frame mechanism is provided with a rear wheel assembly below.

2. The foldable cart frame of claim 1, wherein each collapsing mechanism comprises a rotational shaft, a left folding arm, a right folding arm, and locking mechanisms; the left folding arm and the right folding arm are cross-arranged at middle upper portions, and a rotational shaft is rotatably provided at the cross position, the left folding arm and the right folding arm being rotatably connected via the rotational shaft; upper and lower ends of the left folding arm and the right folding arm are each provided with a locking mechanism; an upper end of the left folding arm and an upper end of the right folding arm are slidably connected to the foldable upper connection frame via the respective locking mechanisms; a lower end of the left folding arm is slidably connected to the rear frame mechanism via the respective locking mechanism, and a lower end of the right folding arm is slidably connected to the front frame mechanism via the respective locking mechanism; the locking mechanisms at the upper ends of the left folding arm and the right folding arm are each provided with a first through hole; the foldable upper connection frame is symmetrically provided with second through holes;

when the frame is expanded, each first through hole and a respective second through hole coincide and are fixedly connected by a bolt inserted through the first through hole and the second through hole.

3. The foldable cart frame of claim 2, wherein both ends of the rotational shaft are respectively provided with housing covers; side walls of the housing covers are provided with slots penetrating through the housing covers; the left folding arm and the right folding arm are respectively positioned at the slots of the corresponding housing covers.

4. The foldable cart frame of claim 2, wherein the front frame mechanism comprises a front support leg, a front upper crossbeam, and a front lower crossbeam; both ends of the front upper crossbeam are respectively inserted into the first upper connecting members and fixed by bolts; an upper end of the front support leg is inserted into a lower end of a first upper connecting member and fixed by a bolt; a lower end of the front support leg is inserted into an upper end of a first lower connecting member and fixed by a bolt; both ends of the front lower crossbeam are respectively inserted into the first lower connecting members and fixed by bolts; the lower end of a right folding arm is slidably connected to the front support leg via a locking mechanism.

5. The foldable cart frame of claim 4, wherein a middle-lower portion of the front support leg is provided with a limit sleeve and fixed by a bolt; the limit sleeve performs limiting on the locking mechanism at the lower end of the right folding arm.

6. The foldable cart frame of claim 2, wherein the rear frame mechanism comprises two rear support legs, a rear upper crossbeam, a rear lower crossbeam, positioning sleeves, and a directional foldable handle; both ends of the rear upper crossbeam are respectively inserted into the second upper connecting members and fixed by bolts; an upper end of each rear support leg is inserted into a lower end of a second upper connecting member and fixed by a bolt; a second lower connecting member is sleeved on a lower portion of the each rear support leg and fixed by a bolt; both ends of the rear lower crossbeam are respectively inserted into the second lower connecting members and fixed by bolts; a lower end of each left folding arm is slidably connected to a respective rear support leg via a locking mechanism; two ends of the directional foldable handle are respectively inserted into the two second upper connecting members from above and extend downward out of the second upper connecting members; the directional foldable handle and the second upper connecting members are connected by bolts; a positioning sleeve is sleeved on a middle portion of each rear support leg and connected by a bolt; an end of the directional foldable handle extending out of each second upper connecting member is inserted into a respective positioning sleeve and connected by a bolt;

wherein the rear wheel assembly is disposed below the two rear support legs;

wherein the lower end of each left folding arm is slidably connected to a respective rear support leg via a locking mechanism;

wherein the positioning sleeve performs limiting on the locking mechanism at the lower end of each left folding arm.

7. The foldable cart frame of claim 6, wherein further comprising a rear wheel locking mechanism; the real wheel locking mechanism comprises support bases and a linkage rod; one end of each support base is rotatably connected to a respective rear support leg via a bolt; both ends of the linkage rod are respectively inserted into corresponding support bases and fixed by bolts; an outer side of each support base is provided with a limit rod; inner sides of two wheels of the rear wheel assembly are each provided with a gear; the limit rods engage with the gears to perform limiting on the rear wheel assembly; a middle portion of the linkage rod is provided with a pedal.

8. The foldable cart frame of claim 2, wherein each foldable upper connection frame comprises a U-shaped connecting member and upper connecting rods; both ends of the U-shaped connecting member are rotatably provided with the upper connecting rods via bolts; one end of one of the upper connecting rods is rotatably connected to the first upper connecting member via a bolt, and one end of the other upper connecting rod is rotatably connected to the second upper connecting member via a bolt; the locking mechanisms located on the left folding arm and the right folding arm are slidably connected to the corresponding upper connecting rods, respectively; the second through holes are provided on the upper connecting rods.

9. The foldable cart frame of claim 2, wherein the foldable lower support frame comprises a front lower bracket, a rear lower bracket, a central connecting member, and a lower link mechanism; front ends of the front lower bracket are rotatably connected to the two first lower connecting members via bolts, respectively; rear ends of the rear lower bracket are rotatably connected to the two second lower connecting members via bolts, respectively; front ends of the rear lower bracket are symmetrically provided with the central connecting member and connected by bolts; front ends of the central connecting member are rotatably connected to both ends of the front lower bracket via bolts, respectively; an inner side of the central connecting member is provided with insertion sleeves; both ends of the lower link mechanism are respectively inserted into the two insertion sleeves and connected by bolts.

10. The foldable cart frame of claim 9, wherein each of the central connecting members is provided with two insertion sleeves.

* * * * *